United States Patent [19]
Knight et al.

[11] 3,841,402
[45] Oct. 15, 1974

[54] FRACTURING WITH RADIATION-INDUCED POLYMERS

[75] Inventors: Bruce L. Knight; John S. Rhudy; William B. Gogarty, all of Littleton, Colo.

[73] Assignee: ICI America Inc., Wilmington, Del.

[22] Filed: Nov. 6, 1972

[21] Appl. No.: 303,735

[52] U.S. Cl............. 166/247, 252/8.55 R, 166/308
[51] Int. Cl............................................. E21b 43/26
[58] Field of Search ........... 166/247, 283, 282, 308; 252/8.55 R; 137/13

[56] References Cited
UNITED STATES PATENTS

| | | | |
|---|---|---|---|
| 3,114,419 | 12/1963 | Perry et al. | 166/295 X |
| 3,252,904 | 5/1966 | Carpenter | 166/282 X |
| 3,336,979 | 8/1967 | Ingraham et al. | 166/283 |
| 3,520,313 | 7/1970 | Seymour | 166/308 |
| 3,537,525 | 11/1970 | Sarem | 166/308 |
| 3,542,044 | 11/1970 | Hansen et al. | 166/308 X |
| 3,562,226 | 2/1971 | Gayley et al. | 166/308 X |
| 3,727,689 | 4/1973 | Clampitt | 166/283 |
| 3,730,275 | 5/1973 | McClaflin et al. | 166/308 |

FOREIGN PATENTS OR APPLICATIONS

| | | | |
|---|---|---|---|
| 683,476 | 3/1964 | Canada | 166/275 |

*Primary Examiner*—Stephen J. Novosad
*Attorney, Agent, or Firm*—Joseph C. Herring; Richard C. Willson, Jr.; Jack L. Hummel

[57] ABSTRACT

Improved fracturing with water-containing fracturing fluids is obtained by incorporating into the water phase of the fracturing fluid a polymer, preferably water-soluble, obtained as a product of radiation-induced polymerizaton of acrylamide, methacrylamide, acrylic acid, methacrylic acid, alkali metal salts thereof or mixtures thereof. Preferably, the polymer is a copolymer. The polymerization is preferably carried out in 10–60 percent aqueous monomer solution with gamma radiation. The mixture of monomers, before radiation, preferably contains 25–99 percent acrylamide and 75–1 percent sodium acrylate. Other additives may be incorporated into the fracturing fluid to impart desired properties.

27 Claims, No Drawings

FRACTURING WITH RADIATION-INDUCED POLYMERS

CROSS REFERENCE TO RELATED APPLICATIONS

The following patent applications are related to the general field of this invention:
Ser. No. 303,737, filed Nov. 6, 1972;
Ser. No. 303,743, filed Nov. 6, 1972;
Ser. No. 302,448, filed Oct. 31, 1972, now abandoned;
Ser. No. 303,744, filed Nov. 6, 1972;
and application
Ser. No. 303,739, filed Nov. 6, 1972, titled "Process for Recovering Hydrocarbon Using Polymer Obtained by Radiation Polymerization."

BACKGROUND OF THE INVENTION

1. Field of the Invention

This invention relates to hydraulically fracturing a subterranean formation having an injection means in fluid communication with the formation. For example, a well in fluid communication with an oil-bearing formation can be fractured.

2. Description of the Prior Art

The productivity of a producing formation contaminated with cement, drilling mud, foreign particles, waxy occlusions, emulsion blocks, tight or small permeabilities, etc. can be improved by various stimulation methods. One method is to pump a fracturing fluid down into the formation at a pressure which exceeds the "parting" or fracturing pressure of the rock and thus fracture the formation to make it more permeable to the flow of hydrocarbons into the well bore. The fracturing process causes permeable channels to be formed within the formation to transport the fluid toward the borehole. Propping agents can be incorporatd into the fracturing fluid to keep the permeable channels propped open so that they will not close open the return of the well to production. Examples of such propping agents include glass beads, metal objects, and sand. Patents which are representative of the prior art include the following:

U.S. Pat. No. 3,378,074 to Kiel uses water-in-oil emulsions as fracturing fluids. He uses a wetting agent on the periphery of the emulsion to reduce friction between the injection stream surface and the fracturing fluid. U.S. Pat. No. 3,603,400 to Son teaches a micellar dispersion comprised of hydrocarbon, aqueous medium, and surfactant and optionally electrolyte and cosurfactant as a fracturing fluid. The viscosity of the dispersion is designed to obtain low penetrating fluids.

U.S. Pat. No. 3,542,044 to Hansen et al reduces energy loss during the pumping of the fracturing fluid into the formation by incorporating within the fracturing fluid (contains a major amount of water) about 0.1–10 percent of polyacrylamide having a molecular weight of at least 3,000,000. Examples of the polyacrylamides are those having 5–40 percent of the amide groups hydrolyzed to carboxylic groups. The patent teaches in Column 1, lines 64–66 that this can be obtained by "treating the polymer with caustic as is known in the art." The patent states that polyacrylamide is useful in the reduction of "friction loss" in fracturing oil field operations. Also, the polyacrylamide is useful as a dispersing agent.

U.S. Pat. No. 3,537,525 to Sarem reduces the friction loss in pumping a fracturing fluid through a conduit by incorporating an acrylic acid-acrylamide diacetone acrylamide terpolymer into the fracturing fluid in concentrations up to 500 ppm. This terpolymer imparts better friction reduction properties than a partially hydrolyzed polyacrylamide.

U.S. Pat. No. 3,370,650 to Watanabe teaches improved fracturing using a suspension of finely divided particles of waterinsoluble, oil-soluble homogeneous solid solution of wax and polymer in an aqueous solution of a partially hydrolyzed, high molecular weight polyacrylamide which is water soluble. The polyacrylamide has 12–67 percent of the original amide groups hydrolyzed to carboxyl groups.

U.S. Pat. No. 3,254,719 to Root reduces the pressure drop due to fluid flow of fracturing fluid in a conduit by incorporating within the fluid 0.005–4 weight percent of an acrylamide polymer having a molecular weight such that 0.5 weight percent solution of the polymer in a 4 weight percent sodium chloride aqueous solution has an Ostwald viscosity of 8–60 cp at 25°C. Also, the polymer can be a long chain polymer of ethylene oxide having a molecular weight of 1–10,000,000. The acrylamide polymer can be a copolymer of acrylamide with other monoethylenically unsaturated monomer copolymerizable therewith and which meet the above molecular weight requirements.

U.S. Pat. No. 3,562,226 to Gayley et al. teaches reduction of friction loss in oil-well fracturing by incorporating within the fracturing fluid a copolymer of acrylamide and dimethyl diallyl ammonium chloride or other diallyl ammonium compounds.

SUMMARY OF THE INVENTION

Applicants have discovered an improved method of fracturing a subterranean formation by incorporating within the water phase of a fracturing fluid a polymer, preferably water soluble, obtained by radiation polymerization of acrylamide, methacrylamide, acrylic acid, methacrylic acid, alkali metal salts thereo, and mixtures thereof The aqueous solution to be polymerized contains about 10–60 percent by weight of monomer. A preferred mixture of monomers contains 25–99 percent acrylamide and 75–1 percent by weight, based on the total weight of monomer, of sodium acrylate. Radiation intensity is 250–1,000,000 rads/hr., and the dosage is 500–300,000 rads. The copolymers of this invention impart improved friction reduction characteristics, improved suspension characteristics, reduced viscosities at high shear rates, increased viscosities at low shear rates, etc. to the fracturing fluid.

PREFERRED EMBODIMENTS OF THE INVENTION

The monomer is preferably a combination of at least one compound selected from the group consisting of acrylamide and methacrylamide and at least one compound selected from the group consisting of acrylic acid, methacrylic acid, alkali metal acrylate, and alkali metal methacrylate. However, the polymer can be a homopolymer obtained from one of the above monomers. Minor amounts of additional ethylenically unsaturated, copolymerizable monomers may also be present. Preferably, the monomer is a mixture of acrylamide and sodium acrylate. It is preferred that the monomer contain about 1–75 percent and preferably 15–55 percent and more preferably 25–50 percent of acrylic acid or alkali metal salt thereof, e.g. sodium acrylate.

Irradiation of the monomer is preferably carried out in aqueous solution containing about 10 to about 60 percent and more preferably about 15 to about 45 percent by weight of dissolved monomer. At the lower concentrations of monomer, the product is generally a pourable polymer solution and at concentrations of above about 15 percent by weight, the product is generally a nonpourable gel. A water-insoluble product may result at concentrations of above about 60 percent monomer; thus, such high concentrations are undesirable. Of course, the particular limits of monomer concentration will depend, among other things, on the radiation conditions used, monomers used, and on the desired product for a particular use. The intrinsic viscosity of the polymer product increases as the monomer concentration increases, up to the point where the amount of cross-linking becomes appreciable, provided all other variables are kept constant.

The aqueous monomer solution preferably contains not more than about 5 ppm of transition metal ions, such as nickel, iron, and cobalt, and no more than about 0.5 ppm of cuprous and cupric ions.

Irradiation of the aqueous monomer solution may be accomplished with high energy ionizing radiation. The radiation used has a wavelength below 3,500 Angstroms and preferably below 2,000 Angstroms. The radiation employed may be particulate or electromagnetic in nature. Examples include accelerated electrons, protons, neutrons, etc., as well as X-rays and gamma-rays, the latter being preferred.

Radiation intensity is preferably about 1,000 to about 300,000 rads/hr. and more preferably about 5,000 to about 200,000 rads/hr. Intensity directly influences the molecular weight of the copolymer. That is, under otherwise icentical conditions, low intensities generally give higher molecular weights.

The radiation dose is preferably at least about 1,000 rads and more preferably at least about 1,500 rads. The maximum dose is preferably not more than 100,000 rads and more preferably not more than 50,000 rads.

The radiation dose used directly influences the intrinsic viscosity and degree of monomer-to-polymer conversion. At a given radiation intensity and monomer concentration, an increase in radiation dose generally tends to result in a decrease in the intrinsic viscosity of the polymer produced and an increase in the degree of monomer-to-polymer conversion. The radiation dose may also influence the water-solubility of the polymer as it has been found that too high a radiation dose may render the resulting polymer water-insoluble. At the preferred dosage rates, conversions up to about 100 percent and preferably 80–100 percent of the monomer to polymer may be obtained without undue insolubilization.

The pH of the aqueous monomer solution is generally not critical except very low pH values may cause insoluble products to form. Preferably the pH is within the range of 3–13 and more preferably about 8 to about 11. Although higher and lower pH values may be used, it should be recognized that hydrolysis tends to occur at pH values much below about 3 and much above about 11.

While the process described above may be used to prepare polymers having an intrinsic viscosity from about 6 to about 30 dl/g (deciliters per gram) in 2 normal sodium chloride at 25.5°C, the process is modified somewhat to prepare polymers having an intrinsic viscosity below about 6 dl/g or above about 30 dl/g in 2 normal sodium chloride at 25.5°C. Polymers having an intrinsic viscosity below about 6 dl/g are prepared by carrying out the polymerization reaction described above in the presence of a chain transfer agent. The chain transfer agent tends to restrict the growth of active polymer chains and thereby results in the formation of polymers having lower molecular weights and lower intrinsic viscosities. The chain transfer agents which may be used herein may be any chain transfer agent which tends to restrict the growth of the polymer chains and thereby aid the formation of lower molecular weight and lower intrinsic viscosity polymers and which is soluble in the reaction medium. Illustrative examples of chain transfer agents which may be used include lower alkyl alcohols, such as methanol, ethanol, and isopropanol; halogenated compounds, such as trichloroacetic acid; thiosorbitols containing two thio groups and four secondary hydroxyl groups; and mercaptans. The concentration of chain transfer agent used depends upon the intrinsic viscosity desired, the monomer concentration, and the chain transfer constant of the chain transfer agent used. The use of a chain transfer agent is not necessary in order to prepare polymers having intrinsic viscosities from about 6 to about 30 dl/g; but if desired, such polymers may be prepared in the presence of chain transfer agents.

In order to prepare polymers having an intrinsic viscosity above about 30 dl/g, the polymerization reaction is terminated when less than about 75 percent and preferably when less than about 60 percent by weight of the monomer has been converted to polymer. It has been found that the intrinsic viscosity of the resulting polymer tends to decrease as the percent conversion of monomer to polymer increases. For reasons of economy, it is not practical to have conversions lower than about 20 percent.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare polymers useful in the process of this invention. For example, while a polymer useful in the process of this invention may be prepared at a monomer concentration of 60 percent by weight, provided the radiation dose used is sufficiently low to result in the formation of water-soluble polymers, the use of a monomer concentration of 60 percent by weight, an intensity of 250 rads per hour, and a dose of 300,000 rads, results in the formation of water-insoluble polymers. In view of this interdependency of intensity, dose, and monomer concentration, it may be necessary to perform a limited amount of experimentation in order to prepare a polymer having the desired intrinsic viscosity. However, this experimentation may be kept to a minimum in view of the disclosure in Table 1 below of the preparation of a variety of polymers of different viscosities and in view of the discussion above on the effect of intensity, dose, monomer concentration, degree of conversion, and chain transfer agent on the intrinsic viscosity of the polymer. Accordingly, the reaction conditions which may be used to prepare a water-soluble polymer having an intrinsic viscosity different from the intrinsic viscosities of the polymers described in Table 1 may be readily determined by minor modification of the reaction conditions given in Table 1 for the preparation of the polymer having the intrinsic viscosity nearest to the intrinsic viscosity of the polymer which is desired to be prepared. Such modification may be made in view of the discussions above on the effect of intensity, dose, monomer concentration, percent conversion of monomer to polymer, and chain transfer agent on the intrinsic viscosity of the polymer. For example, a polymer having an intrinsic viscosity of about 16 dl/g may be prepared by using the same reaction conditions employed in Example F, Table 1, except that the radiation intensity is increased, the total radiation dose is increased, the monomer concentration is lowered, the percent monomer conversion is increased, and/or the reaction is carried out in the presence of a chain transfer agent. It is generally preferred, however, that the said decrease in intrinsic viscosity be obtained by increasing the radiation intensity, lowering the monomer concentration, and/or using a chain transfer agent.

The product of irradiation is an aqueous solution of the water-soluble polymer which may be in the form of a pourable liquid or a nonpourable, rubbery gel, depending upon the polymer concentration and intrinsic viscosity of the polymer. The viscosity of the polymer solutions tend to increase as the concentration and intrinsic viscosity of the polymer increase. The polymer solutions produced by the radiation may be admixed with water and used directly or the polymer solution may be concentrated by conventional means or it may be recovered in particulate form, i.e. dry form. For example, a nonpourable gel may be finely subdivided and the water removed from the subdivided gel with a water-miscible, volatile organic liquid, e.g. with methanol, which has no affinity for the copolymer. be The polymers obtained from this radiation copolymerization have relatively low Huggins constants. This constant is related to the linearity of the polymer where molecular weights are constant, i.e. for two copolymers having similar molecular weights, but different Huggins constants, the lower Huggins constant indicates a more linear polymer. Polymers having Huggings constants below 1 and preferably below 0.7 and more preferably below 0.5 are most often used with this invention. In certain applications, a mixture of polymers having low and high or low, medium, and high, Huggins constants may e desired. A more detailed definition of Huggins constant and a method for determining the Huggins constant of a polymer is found in "Textbook of Polymer Chemistry," Billmeyer, Interscience Publishers, N.Y., 1957, pp. 128–139.

Intrinsic viscosity of the polymer can vary from less than about 1 to about 60 dl/g and preferably is about 5 to about 35 dl/g. The permeability of the reservoir rock to be treated will greatly influence the desired intrinsic viscosity, but, generally speaking, a lower permeability reservoir rock demands lower intrinsic viscosities. For example, permeabilities less than about 50 md will generally demand intrinsic viscosities of about 10 or less, whereas permeabilities of about 200 md or more will generally demand intrinsic viscosities up to and greater than 20. The intrinsic viscosity numbers referred to are measured in a 2 normal sodium chloride solution at 25.5°C. Of course, copolymers having very high intrinsic viscosities have the property to "plug" or "bridge" pore holes in reservoir rock. It can generally be concluded that the effectiveness of the polymer increases as the intrinsic viscosity increases. Where the reservoir is characterized by a very high permeability, i.e. in excess of 1 darcy, the intrinsic viscosity is desirably greater than 25 dl/g.

The polymer may be solubilized and diluted to the desired concentration with water. The use of water containing high concentrations of polyvalent metallic cations which have an adverse effect on the viscosity of the polymer solution or on the water-solubility of the polymer is preferably avoided. The concentration of polyvalent metallic cations which may present in the aqueous polymer solution is dependent upon the specific polyvalent metallic cation present, the temperature and pH of the solution, and the intrinsic viscosity and anionic content of the polymer. In general, the polymer becomes less tolerant of polyvalent metallic cations as the intrinsic viscosity, anionic content, and concentration of the polymer increase. The use of water containing substantial amounts of copper ions and/or iron ions is preferably avoided due to the adverse effect such ions may have on the water-solubility of the polymer, etc. Where maximum viscosity is desired for a given polymer concentration, the water preferably contains less than about 500 ppm of TDS (total dissolved solids). Also, where maximum viscosities are desired, the water preferably contains less than about 50 ppm of divalent cations, such as calcium and/or magnesium, i.e. the water is classified as " soft" water.

The aqueous phase of the fracturing fluid can contain about 0.005 to about 5.0 and preferably about 0.01 to about 1.0 and more preferably about 0.05 to about 0.05 weight percent of the radiation-induced polymer, the percents being based on the aqueous phase. Of course, other additives can be added to the fracturing fluid to impart desired characteristics. For example, propping agents are generally incorporated within the fracturing fluid and, of course, the higher the viscosity imparted by the polymer to the aqueous solution, the greater the capacity of the fracturing fluid to carry larger and heavier propping materials. Examples of useful propping agents include coarse sand grains, tempered glass beads, rounded walnut shell fragments, aluminum pellets, and like materials including other materials known in the art. Such propping agents can be incorporated into the fracturing fluid in concentrations of about 0.1 to about 5 lbs/gal. and preferably about 0.5 to about 3.5 lbs/gal of fracturing fluid. Generally, propping agents having particle sizes of about 6-mesh to about 400-mesh and preferably 10 to about 100-mesh and more preferably 10 to about 20-mesh are incorporated; the desired size will, of course, depend upon the particular reservoir to be fractured.

Prefracturing agents can be injected into the formation prior to the injection of the fracturing fluid. Examples of such agents include acids, surfactants, systems containing surfactants such as micellar solutions and emulsions, an other like systems known in the art which will impart some desired characteristic to the reservoir.

Diverting agents may be intermittently injected into the well while injecting the fracturing fluid to obtain a more uniform fracturing profile. Such methods are known in the art. Such a process is usually desirable where the formation is a heterogeneous formation having highly permeable zones. Also, packers can be used to segregate a portion of the formation to be fractured. The well can be a perforated completion, e.g. through casing, or an open hole completion. Injection wells and production wells are useful with this invention.

When it is desired to prepare polymers having the highest intrinsic viscosity, the reaction conditions should be such that the total radiation dose and conversion is low, the monomer concentration high, and the radiation intensity at a minimum. Of course, the above parameters are within the specified parameters within this patent specification. More specifically, to prepare polymers having an intrinsic viscosity of about 30–60, the intensity is preferably about 1,000 to about 100,000 rads/hr and more preferably about 5,000 to about 50,000 rads/hr and the monomer concentration is preferably about 20–60 percent and more preferably about 25–50 percent and the conversion about 20–75 percent and preferably below about 60 percent.

When it is desired that the polymers readily adsorb on the formation rock, the anionic content of the polymer is desirably below 30 percent, and more preferably less than about 20 percent and most preferably less than about 15 percent.

If it is desired to have a branched or partially cross-linked polymer, branching and cross-linking can be obtained by overradiating, i.e. by continuing the radiation after all the monomer has been converted to polymer. Also, such can be accomplished by continuing the radiation after water-insoluble polymer begins to form. Also, ethylenically unsaturated water-soluble copolymerizable monomers containing more than one ethylenically unsaturated bond may be used. Examples of such include methylene, bisacrylamide, polyacrylates such as sorbitol polyacrylate, and polyallyl ethers of sorbitol, e.g. diallylsorbitol and hexallylsorbitol. Of course, the water solubility of the polymer will depend upon the degree of branching and/or cross-linking. Where it is desired to have a polymer that is substantially water-insoluble, then the branching and cross-linking of the polymer can be fairly extensive. As is evident, an extensively cross-linked polymer may be desired where very high permeabilities are characteristic of the formation to be fractured and the fracturing fluid has agents or is under sufficient turbulent flow to keep the polymer in suspension.

It is also contemplated that during the fracturing of a subterranean formation, the intrinsic viscosity, the degree of branching or cross-linking of the polymer, the Huggins constant, and the anionic content of the polymer used can be varied as the fracturing process is accomplished to obtain a more uniform fracturing profile.

The polymers of this invention can be selected to exhibit very high viscosities at low shear rates—this property facilitates the suspension of agents, e.g. propping agents, in the fracturing fluid and also permits higher viscosities at the rock face just before fracturing. Once the fracturing occurs, the polymer can exhibit low viscosities at high shear rates.

Also, the polymer can be selected to have improved shear degradation characteristics. That is, polymers generally tend to degrade as they pass through a region of high shear rate, e.g. as the fracture "opens up." By selecting a polymer with some degree of branching or some degree of cross-linking, the polymer will be less sensitive to shear degradation. Thus, for given molecular weight polymers, a polymer having a higher Huggins constant will be less sensitive to shear degradation.

The fracturing fluid can be followed by fluids known in the art to displace the fracturing fluid out into the reservoir once the fracture is initiated. Also, the fracturing fluid can contain agents to facilitate suspension of less water-soluble polymers of this invention, agents to solubilize, chemically degrade or restore permeability to the formation after he polymer is injected into the formation. For example, an aqueous sodium hypochlorite solution can be injected after the polymer solution to degrade the polymer and thus restore some of the permeability to the reservoir rock. Of course, acidizing can follow to improve the permeability; also, solubilizing solutions such as micellar solutions and other types of surfactantcontaining fluids may be used.

The fracturing fluid can be any type of fluid as long as it contains a water phase. For example, the fluid can contain hydrocarbon and either the hydrocarbon or water can be the external phase, it can be a water-in-oil or oil-in-water emulsion or microemulsion, etc. Also, the fracturing fluid of this invention may be a veneer of water containing the polymer, the veneer surrounding a viscous fracturing fluid, either containing predominately water or hydrocarbon or both, etc.

The following examples are presented to teach specific working embodiments of this invention; such are not meant to limit the interpretation of the invention. Unless otherwise specified, all percents are based on volume.

Preparation of the Polymers

Polymers are prepared with Cobalt 60 gamma radiation; radiation intensities and dosages are outlined in Table 1. The process for preparing Polymer A is explained; preparation of the other polymers is similar except for variations indicated in Table 1.

To 24,000 1 gms of deionized water there are added 692 gms of sodium hydroxide. After cooling the solution to 30°C, 1,250 gms of acrylic acid are added. Thereafter, 5,000 gms of acrylamide are added while mixing and the pH is adjusted to 9.4. The resulting solution contains 75 percent by weight acrylamide (AAd) and 25 percent by weight sodium acrylate (NaAA) and has a total monomer concentration of 21.4 percent by weight. The solution is purged with $N_2$ for 20 minutes and thereafter sealed. The sample is irradiated with Cobalt 60 gamma radiation at an intensity of 18,000 rads/hr. (R/hr.) to a total dose of 8,800 rads (R). The resulting product is a gel-like mass.

A portion of the gel is weighed and thereafter extracted with methanol to precipitate the polymer. The polymer is dried in a vacuum oven at 36°C and 0.02 psia for 24 hours and then to constant weight at 110°C. Weight of the dried product divided by the theoretical weight gives a monomer conversion of 93 percent.

A portion of the gel is solubilized in water by first extruding it through a "meat" grinder; the "spaghetti"—like extrusion is cut into "BB" size particles and then dissolved in water by agitating at a low rpm to prevent substantial shearing of the polymer.

The residue of the gel is produced in dry powder form by first extruding the gel, then dissolving it in water and thereafter adding methanol to precipitate the polymer out of solution. The polymer is then ground to less than 20-mesh size and finally dried at 60°C in a vacuum oven.

The intrinsic viscosity is measured at 25.5°C in 2 normal NaCl aqueous solution. The Huggins constant is measured by the method described in "Textbook of Polymer Chemistry," Billmeyer, Interscience Publishers, New York, 1957, pp. 128–139.

The monomer used in Sample "G" is dissolved in water containing 9.1 percent by weight of methanol.

fracturing fluid so that efficient fracturing can be effected.

The core samples are sandstone cores 1 inch diameter by 3 inches long. The front section includes only the first one inch of the core length. They are flooded at a frontal velocity of 10 ft/day. The polymers are dissolved in water containing Table 2-indicated amounts of TDS. Water containing 500 of TDS is used to measure the permeabilities. The results are indicated in Table 2.

TABLE 1

INFORMATION ON POLYMER SAMPLES

| Polymer | AAd/NaAA Wt. Ratio | Monomer Concentration(%) | pH | Intensity (R/hr.) | Total Dose (R) | Additive (%) | Monomer Conversion (%) | Intrinsic Viscosity Gel (dl/g) | Intrinsic Viscosity Powder (dl/g) | Huggins Constants Gel | Huggins Constants Powder |
|---------|--------------------|--------------------------|-----|-------------------|----------------|--------------|------------------------|--------------------------------|----------------------------------|-----------------------|--------------------------|
| A | 75/25 | 21 | 9.4 | 18,000 | 8,800 | — | 93 | 23.7 | 23.0 | — | 0.19 |
| B | 70/30 | 21 | 9.4 | 20,000 | 9,800 | — | 93 | 22 | 20 | 0.19 | 0.19 |
| C | 60/40 | 22 | 9.4 | 20,000 | 10,300 | — | 93 | 23.0 | 23.0 | — | — |
| D | 70/30 | 30 | 9.5 | 230,000 | 50,000 | — | 91 | 14 | 12.8 | — | 0.38 |
| E | 70/30 | 40 | 9.5 | 10,000 | 1,760 | — | 34 | 39.4 | 33 | 0.06 | — |
| F | 70/30 | 24 | 9.5 | 100,000 | 15,000 | — | 86 | 18.5 | — | 0.24 | — |
| G | 70/30 | 27 | 9.5 | 20,000 | 11,500 | MeOH 9.1 | 91 | 12.4 | 11.7 | 0.31 | 0.38 |
| H | 70/30 | 13 | 9.5 | 220,000 | 44,000 | MeOH 15 | 96.5 | 1.0 | — | — | — |
| I | 70/30 | 13 | 9.5 | 220,000 | 44,000 | — | 96.5 | 5.8 | — | 0.64 | — |
| J | 70/30 | 25 | 9.5 | 220,000 | 44,000 | MeOH 15 | 84.0 | 6.9 | — | 0.52 | — |
| K | 70/30 | 24 | 9.5 | 20,000 | 7,660 | — | 86.7 | 28.2 | — | 0.13 | — |
| L | 70/30 | 30 | 9.5 | 20,000 | 2,667 | — | 54 | 31.0 | — | 0.04 | — |
| M | 90/10 | 40 | 9.6 | 10,000 | 1,350 | — | 24 | 53 | — | Less than 0.02 | — |

TABLE 2

RESULTS OF POLYMER FLOODING IN 100–200 md SANDSTONE CORES

| Run | Polymer | Brookfield Viscosity at 6 rpm (cp) | Initial Permeability (md) Front | Flushed Permeability (md) Front | Permeability Reduction Front |
|-----|---------|-------------------------------------|----------------------------------|-----------------------------------|-------------------------------|
| 1 | A | 26.7 | 107 | 0.5 | 214 |
| 2 | B | 32.2 | 142 | 1.5 | 93 |
| 3 | C | 27.2 | 132 | 0.9 | 150 |
| 4 | D | 20.0 | 110 | 0.6 | 178 |
| 5 | B | 8.8 | 159 | 1.3 | 124 |
| 6 | B | 7.1 | 97 | 0.7 | 143 |
| 7 | Partially hydrolyzed polyacrylamide | 16.3 | 135 | 2.5 | 54 |
| 8 | Copolymer No. 1 | 39.0 | 123 | 2.6 | 47 |
| 9 | Copolymer No. 2 | 38.5 | 134 | 5.5 | 24.6 |

Runs 1–4 contain 700 ppm polymer dissolved in water containing about 500 ppm TDS.
Run 5 contains 300 ppm polymer dissolved in water containing about 500 ppm TDS.
Run 6 contains 700 ppm polymer dissolved in water containing 18,000–20,000 ppm TDS.
Runs 7–9 contain 800 ppm polymer dissolved in water containing about 500 ppm TDS.
Copolymer No. 1 = a commercially available, anionic acrylamide copolymer obtained by a chemically catalyzed polymerization reaction; has an intrinsic viscosity of 12.5 and a Huggins constant of 0.34.
Copolymer No. 2 = a commercially available, very high molecular weight, strongly anionic copolymer of acrylamide obtained by a chemically catalyzed polymerization reaction; has an intrinsic viscosity of 22.0 and a Huggins constant of 0.18.
Partially hydrolyzed polyacrylamide = a commercially available, partially hydrolyzed, high molecular weight polyacrylamide obtained by a chemically catalyzed polymerization reaction; has an intrinsic viscosity of 12.7 and a Huggins constant of 0.56.

EXAMPLE I

To show that the copolymers of this invention give unexpected results over polymers and copolymers of the prior art, this example is presented.

Fracturing characteristics are simulated in the laboratory by flooding water-saturated reservoir core samples with aqueous polymer solutions at a given frontal velocity. Permeability reduction of the front portion of the cores is determined by first flooding the cores with water at the given frontal velocity and thereafter flooding the cores with aqueous polymer solutions. A high permeability reduction of course is desirable to minimize fluid loss or to obtain low "bleed-off" rates of the Runs 1 through 6, as compared to Runs 7–9, exhibit higher front section permeability reductions than commercially available polymers and copolymers. Polymer E of Table 1 at identical concentrations and water conditions as copolymers No. 1 and No. 2, exhibits a Brookfield viscosity at 6 rpm of 52 cp.

EXAMPLE II

A water-based fracturing fluid containing 2.5 percent by weight of Polymer E in the water phase and 16 gallons of propping agent of 15-mesh size, is injected under sufficient pressure and rates to fractur an injection well formation. Improved injectivity index is realized after the fracture.

We claim:

1. An improved process of fracturing a subterranean formation penetrated by at least one injection means and wherein a fracturing fluid comprised of a high molecular weight polymer is injected into at least a portion of the formation at sufficient pressure and rate to fracture the formation, the improved process comprising incorporating into the water phase of the fracturing fluid of polymer obtained as a product of high energy ionizing radiation polymerization of at least one monomer selected from the group consisting of acrylamide, methacrylamide, acrylic acid, methacrylic acid, alkali metal acrylate, and alkali metal methacrylate, in concentrations of about 10 to about 60 percent by weight dissolved monomer in an aqueous medium, the radiation intensity being about 250 to about 1,000,000 rads/hr and the radiation dose being about 500 rads to about 300,000 rads, and thereafter injecting the fracturing fluid into at least a portion of the formation at a sufficient pressure and rate to fracture the formation.

2. The process of claim 1 wherein the polymer is a homopolymer of acrylamide.

3. The process of claim 1 wherein the polymer is a homopolymer of sodium acrylate.

4. The process of claim 1 wherein the polymer is a copolymer obtained by copolymerizing acrylamide and sodium acrylate.

5. The process of claim 1 wherein the radiation intensity is within the range of about 1,000 to about 300,000 rads/hr.

6. The process of claim 1 wherein the radiation dose is within the range of about 1,000 to about 100,000 rads.

7. The process of claim 1 wherein the aqueous medium is at a pH within the range of about 3 to about 13.

8. The process of claim 1 wherein the pH of the aqueous medium is within the range of about 8 to about 11.

9. An improved process of fracturing a subterranean formation penetrated by at least one injection means and wherein a fracturing fluid comprised of a high molecular weight polymer is injected into at least a portion of the formation at sufficient pressure and rate to fracture the formation, the improved process comprising incorporating into the fracturing fluid a polymer obtained as a product of high energy ionizing radiation polymerization of at least one monomer selected from the group consisting of acrylamide and methacrylamide and at least one monomer selected from the group consisting of acrylic acid, methacrylic acid, alkali metal acrylate, and alkali metal methacrylate, in concentrations of about 10 to about 60 percent by weight dissolved monomer in an aqueous medium, the radiation intensity is about 250 to about 1,000,000 rads/hr and the radiation dose is about 500 rads to about 300,000 rads, and thereafter injecting the fracturing fluid into at least a portion of the formation at a sufficient pressure and rate to fracture the formation.

10. The process of claim 9 wherein one of the monomers is acrylic acid.

11. The process of claim 9 wherein one of the monomers is methacrylic acid.

12. The process of claim 9 wherein one of the monomers is sodium acrylate.

13. The process of claim 9 wherein one of the monomers is sodium methacrylate.

14. The process of claim 9 wherein one of the monomers is acrylamide.

15. The process of claim 9 wherein the polymer is a copolymer obtained by copolymerizing acrylamide and sodium acrylate.

16. The process of claim 9 wherein the radiation intensity is within the range of about 1,000 to about 300,000 rads/hr.

17. The process of claim 9 wherein the radiation dose is within the range of about 1,000 to about 100,000 rads.

18. The process of claim 9 wherein the aqueous medium is at a pH within the range of about 3 to about 13.

19. The process of claim 9 wherein the pH of the aqueous medium is within the range of about 8 to about 11.

20. The process of claim 9 wherein the fracturing fluid contains a propping agent.

21. The process of claim 9 wherein the water phase of the fracturing fluid contains about 0.005 to about 5 percent by weight of the polymer.

22. An improved process of hydraulically fracturing a subterranean hydrocarbon-bearing formation penetrated by at least one injection means and wherein a fracturing fluid comprised of water and high molecular weight polymer is injected into at least a portion of the formation to be fractured, the improved process comprising incorporating into the water phase of the fracturing fluid a water-soluble copolymer obtained by radiation copolymerization of an aqueous solution comprised of about 10 percent to about 60 percent of a mixture of about 25 percent to about 99 percent acrylamide and about 75 percent to about 1 percent sodium acrylate, the radiation intensity being within the range of about 5,000 to about 200,000 rads/hr and the radiation dose being within the range of about 1,500 rads to about 50,000 rads, and injecting the fracturing fluid into at least a portion of the formation at a sufficient pressure and rate to fracture the formation.

23. The process of claim 22 wherein the sodium acrylate is present in concentrations of about 15 to about 55 percent.

24. The process of claim 22 wherein the aqueous phase contains about 0.005 to about 5 percent by weight of the polymer.

25. The process of claim 22 wherein the copolymer obtained from the radiation polymerization is in the form of a gel.

26. The process of claim 22 wherein the fracturing fluid contains a propping agent.

27. The process of claim 22 wherein a temporary diverting agent is intermittently injected into the injection means during the injection of the fracturing fluid.

* * * * *

UNITED STATES PATENT OFFICE
CERTIFICATE OF CORRECTION

Patent No. 3,841,402       Dated 10/15/74

Inventor(s)  Bruce L. Knight et al

It is certified that error appears in the above-identified patent and that said Letters Patent are hereby corrected as shown below:

Col. 1, line 40:        Delete "close open" and insert --close upon--.

Col. 3, line 37:        Delete "icentical" and insert --identical--.

Col. 5, line 39:        After "." delete "be".

Col. 6, line 62:        Delete "an" and insert --and--.

Col. 8, line 40:        Delete "24,000 1/gms" and insert --24,000 gms--.

Signed and sealed this 8th day of April 1975.

(SEAL)
Attest:

RUTH C. MASON
Attesting Officer

C. MARSHALL DANN
Commissioner of Patents
and Trademarks